United States Patent [19]
Brody

[11] Patent Number: 5,463,484
[45] Date of Patent: Oct. 31, 1995

[54] METHOD FOR MANUFACTURING LAMINATED U V-SENSITIVE COLOR FILTERS FOR LIQUID CRYSTAL DISPLAYS

[76] Inventor: Thomas P. Brody, 5823 Kentucky Ave., Pittsburgh, Pa. 15232

[21] Appl. No.: 145,414

[22] Filed: Oct. 29, 1993

[51] Int. Cl.⁶ .................. G02F 1/1335; G02F 1/1333
[52] U.S. Cl. .................. 359/68; 359/74; 359/891
[58] Field of Search .................. 359/68, 74, 891

[56] References Cited

U.S. PATENT DOCUMENTS

| | | | |
|---|---|---|---|
| 4,610,509 | 9/1986 | Sorimachi et al. | 359/68 |
| 4,653,862 | 3/1987 | Morozumi et al. | 359/68 |
| 4,673,253 | 6/1987 | Tanabe et al. | 359/68 |
| 4,690,511 | 9/1987 | Watanabe | 359/68 |
| 4,744,635 | 5/1988 | Takaochi et al. | 359/68 |
| 4,776,671 | 10/1988 | Sumi et al. | 359/68 |
| 4,870,484 | 9/1989 | Sonehara | 358/59 |
| 4,876,165 | 10/1989 | Brewer et al. | 430/7 |
| 4,877,697 | 10/1989 | Vollmann et al. | 430/20 |
| 4,953,952 | 9/1990 | Okumura et al. | 359/68 |
| 4,962,081 | 10/1990 | Harrison et al. | 503/227 |
| 4,965,242 | 10/1990 | DeBoer et al. | 503/227 |
| 4,988,168 | 1/1991 | Dickerson et al. | 359/68 |
| 4,999,094 | 3/1991 | Kamamori et al. | 204/180.2 |
| 5,042,920 | 8/1991 | Yoshino et al. | 359/68 |
| 5,058,997 | 10/1991 | Dickerson et al. | 359/59 |
| 5,073,534 | 12/1991 | Harrison et al. | 503/227 |
| 5,079,214 | 1/1992 | Long et al. | 503/227 |
| 5,101,289 | 3/1992 | Takao et al. | 359/68 |
| 5,186,801 | 2/1993 | Matsumura et al. | 204/181.1 |
| 5,190,794 | 3/1993 | Yoshino et al. | 427/162 |
| 5,246,782 | 9/1993 | Kennedy et al. | 428/421 |

FOREIGN PATENT DOCUMENTS

| | | | |
|---|---|---|---|
| 60-221728 | 11/1985 | Japan | 359/68 |
| 61-140923 | 6/1986 | Japan | 359/68 |
| 3-111802 | 5/1991 | Japan | 359/891 |
| 3-160454 | 7/1991 | Japan | 359/68 |
| 4-303803 | 10/1992 | Japan | 359/68 |
| 5-19113 | 1/1993 | Japan | 359/891 |

OTHER PUBLICATIONS

Latham et al. A New Class of Color Filters for Liquid–Crystal Displays, SID 87 Digest, pp. 379–382.
Product Information 3M, Matchprint™ 1II Transfer System, How to Make a Matchprint™ II Negative Transfer Proof, 1990, (4 pp.).

Primary Examiner—William L. Sikes
Assistant Examiner—Ron Trice
Attorney, Agent, or Firm—Webb Ziesenheim Bruening Logsdon Orkin & Hanson

[57] ABSTRACT

A method of producing a color filter to be used in conjunction with a display element such as an active or passive matrix liquid crystal panel. The color filter is formed by a stack of exposed and developed film layers, and each layer corresponds to a color of the resulting filter. The stack of exposed film layers is deposited on a transparent sheet.

13 Claims, 5 Drawing Sheets

FIG. 1

PRIOR ART

METHOD FOR MANUFACTURING LAMINATED U V-SENSITIVE COLOR FILTERS FOR LIQUID CRYSTAL DISPLAYS

BACKGROUND OF THE INVENTION

1. Field of the Invention

The present invention relates generally to a process for preparing multilayer color filters and more particularly to a process for preparing color mosaic filters for use with a flat panel display, such as a passive or active matrix liquid crystal panel, or a display using other light modulating mechanisms in which a variety of color effects is to be produced.

2. Prior Art

Color filters for use with liquid crystal type displays must satisfy the following stringent performance requirements: 1) optical—the filters must exhibit good color, purity and saturation, high transparency, good white balance and the ability to generate a wide range of colors; 2) dimensional—the filters must accurately match display resolution and dimensions and meet rigid registration requirements; 3) flatness—the filters must be very flat to ensure a cell gap of uniform thickness for the liquid crystal; 4) heat resistance—the filters must be capable of withstanding the high temperatures which are encountered during the curing and sealing processes for the liquid crystal displays; 5) color permanence—the filter colors must be stable under prolonged exposure to back lighting and ultraviolet lighting; and 6) chemical resistance—the filters must be stable to withstand the chemical etching and cleaning solutions which are used in processing of the liquid crystal displays.

Various methods for forming color filters or liquid crystal displays are disclosed in the following U.S. Pat. Nos.: No. 4,876,165 to Brewer et al.; No. 4,965,242 to DeBoer et al.; Nos. 4,988,168 and 5,058,997 to Dickerson et al.; No. 4,999,094 to Kamamori et al.; No. 4,953,952 to Okumura et al.; No. 4,870,484 to Sonehara; No. 4,877,697 to Vollmann et al.; No. 4,690,511 to Watanabe; and Nos. 5,042,920 and 5,190,794 to Yoshino et al.

The Dickerson et al. patents are directed to decal technology for forming color filters with crystal display devices. The Brewer et al. patent discloses preparing filters directly on substrates using different colored soluble dies in a polyimide resin which is then formed into suitable patterns by conventional photolithographic techniques. The DeBoer et al. patent discloses a color filter for preparing a color liquid crystal display device by overlaying a die receiving element with a die donor element and heating the die donor element to transfer the die image in a repeating mosaic pattern to the die receiving layer. The Kamamori et al. patent is directed to a method for producing a color filter on a conductive thin film layer having a given set of plural patterns which is formed on an electrically insulated substrate. A colored layer is formed on the conductive thin film layer by electrodepositing a coloring material and a polymer. The Yoshino et al. patents disclose a method for producing a color filter for use with liquid crystal displays wherein the color filter has a plurality of colored layers printed on a transparent substrate with first and second resin layers coated on the coating layers.

All of the above-described methods either cannot meet performance requirements or are very time-consuming and expensive. It is an object of the present invention to produce a color filter for display elements which satisfies all of the performance requirements and which significantly decreases the manufacturing costs of the dyed polyimide process.

Figure 1:
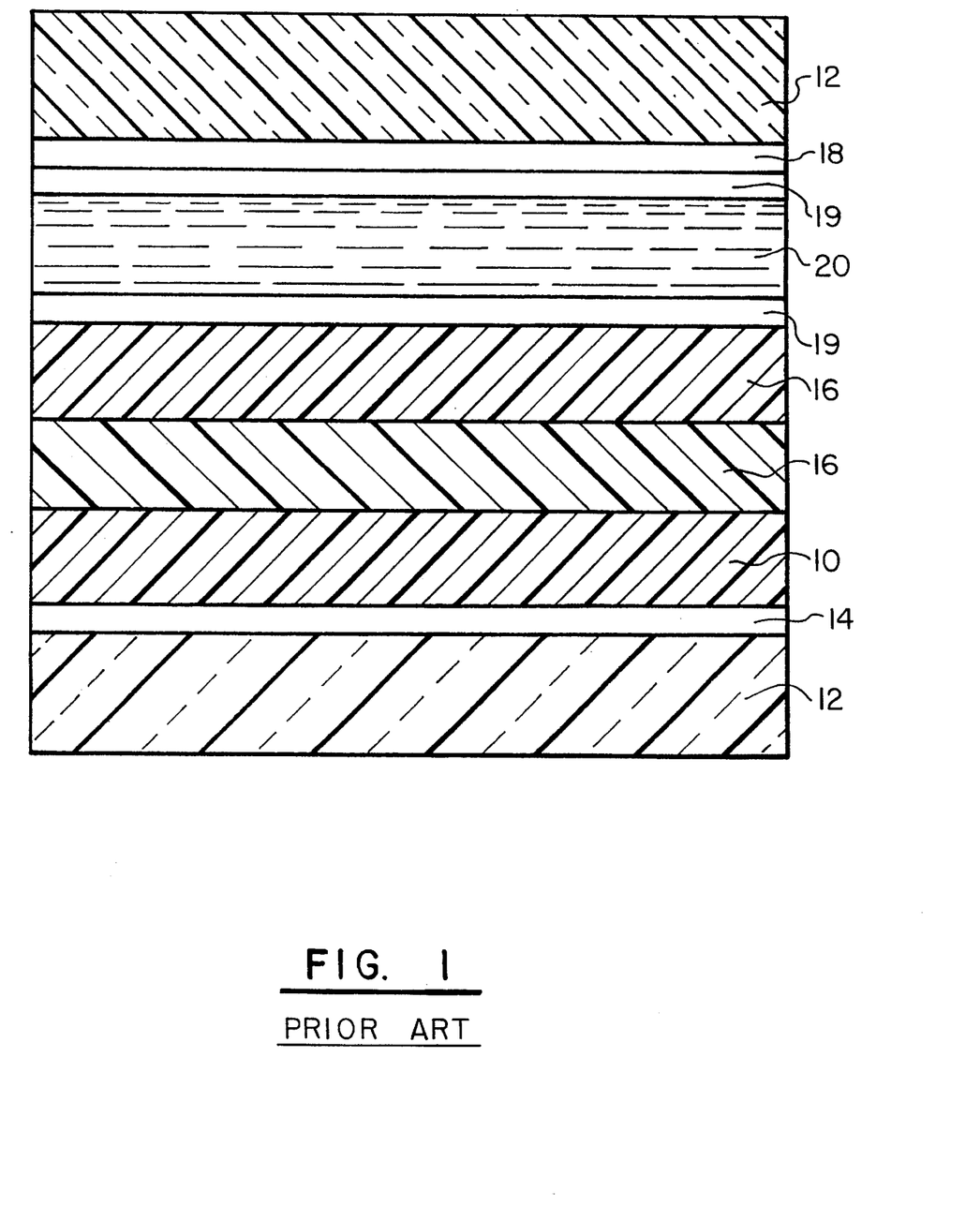
FIG. 1 is a schematic illustration of a color filter in a liquid crystal display element formed according to the prior art.

The Vollmann et al. patent teaches a color filter constructed from pigmented acrylic layers, and is schematically illustrated in FIG. 1 of the application drawings. The Vollmann et al. patent teaches the lamination of a first pigmented layer 10 onto a first transparent plate 12 which carries an array of display electrodes 14. The first pigmented layer 10 is exposed to actinic radiation followed by the removal of the nonimage layers with a liquid developer. The process is repeated several times with differently colored pigmented layers 16 which forms a color filter stack. However, lamination of the pigmented layers directly onto the display electrodes significantly reduces the productivity of the method because only a single filter can be formed at a given time. The lamination of pigmented layers 10 and 16 in the filter stack with display electrodes 14 below the color filter stack increases the thickness of the gap between display electrodes 14 and electrode 18 formed on the opposite side of liquid crystal layer 20 adjacent an alignment layer 19. Alignment layers 19 are positioned on opposite sides of the liquid crystal layer 20. A transparent plate 12 is adjacent the electrode 18. The increase in the thickness of the gap requires a greater operating voltage. For example, the typical thickness of the liquid crystal layer in a display is 5–6 microns while the thickness of a filter stack, composed of four or more pigmented layers, is at least 25–30 microns, depending on the specific manufacture of the layers. The voltage drop across the filter stack compared to the voltage drop across liquid crystal layer 20 is in approximate proportion to the thickness ratio (i.e., 5:1). Therefore, this arrangement requires the application of approximately six times more voltage than if electrodes 14 and 18 are positioned closely adjacent to liquid crystal layer 20. The increase in the voltage is impractical, requiring higher voltage drive circuitry and correspondingly higher power dissipation. In other applications, for example in thin film electroluminescent displays, the increased voltage becomes even more serious since such displays already require voltage drives on the order of 150 volts. It is an object of the present invention to increase the productivity of the fabrication process, to avoid lamination of the pigmented layers directly onto the display electrodes and to reduce the voltage required by the Vollmann et al. patent.

SUMMARY OF THE INVENTION

The present invention provides a method of producing color mosaic filters for electronic color displays. The color displays may be flat display panels, such as passive or active matrix liquid crystal panels; displays using other light modulation mechanisms, such as dipole suspension; emissive displays, such as plasma or electroluminescent panels, in which the range of emitted colors is insufficient to produce all required colors; or any other type of light-modulating or light-emissive display in which a variety of color effects is desired. The method of the present invention includes a filter stack formed by one or more filter layers laminated to a carrier sheet. Each filter layer is a film layer which is laminated sequentially to the carrier sheet, then exposed and developed. The filter stack is then attached to a substrate which can then be bonded to a display element.

The first filter layer is formed by laminating a pigmented layer structure onto a carrier sheet by means of heat and pressure, wherein the pigmented layer structure includes an ultraviolet light-sensitive film layer, specifically an acrylic layer or base containing a pigment of one color of the selected filter colors. The pigmented layer is supported on a release layer which is removed from the first pigmented layer structure after lamination. With the heating and pressure applied during the lamination process, adhesive between the pigmented layer and the carrier sheet bonds such that it becomes stronger than the adhesive between the release layer and the pigmented layer. The adhesive between the release layer and the pigmented layer may weaken during the lamination process. The adhesive between the release layer and the pigmented layer will remain attached to the release layer upon removal of the release layer from the pigmented layer.

A photomask having the geometrical pattern selected for the acrylic layer is placed in intimate contact with the pigmented layer and the acrylic layer is exposed to ultraviolet light through the mask. The exposed acrylic layer is developed using conventional equipment which leaches the pigment out of the unexposed portions of the acrylic layer leaving clear, transparent areas.

Each subsequent pigmented layer structure is laminated onto the developed acrylic layer(s), wherein the subsequent pigmented layer structure also includes a film layer such as an ultraviolet light-sensitive acrylic layer containing a pigment of another color of the color filter and an attached release layer. The release layer and attached adhesive are subsequently removed after lamination and an appropriate photomask is positioned adjacent to the acrylic layer. The acrylic layer is exposed to a source of ultraviolet light and developed. Additional pigmented layers are repeatedly put onto the existing acrylic layers according to this method to generate the desired filter structure normally consisting of three primary colors, such as red, green and blue and a black pattern surrounding each colored element.

The method preferably includes the steps of laminating the stack of acrylic layers onto a transparent backing layer, such as glass, and removing the carrier sheet from the stack prior to depositing transparent conductors onto the stack. The method of the present invention can further include the step of depositing a planarizing layer onto the stack prior to depositing the transparent conductors onto the stack.

It is anticipated that the method of the present invention can be utilized to simultaneously form a stack of acrylic layers which can be cut into a plurality of individual filters following its formation.

These and other objects of the present invention will be clarified in the description of the preferred embodiments in connection with the attached figures of drawings.

DESCRIPTION OF THE PREFERRED EMBODIMENTS

Figure 2:
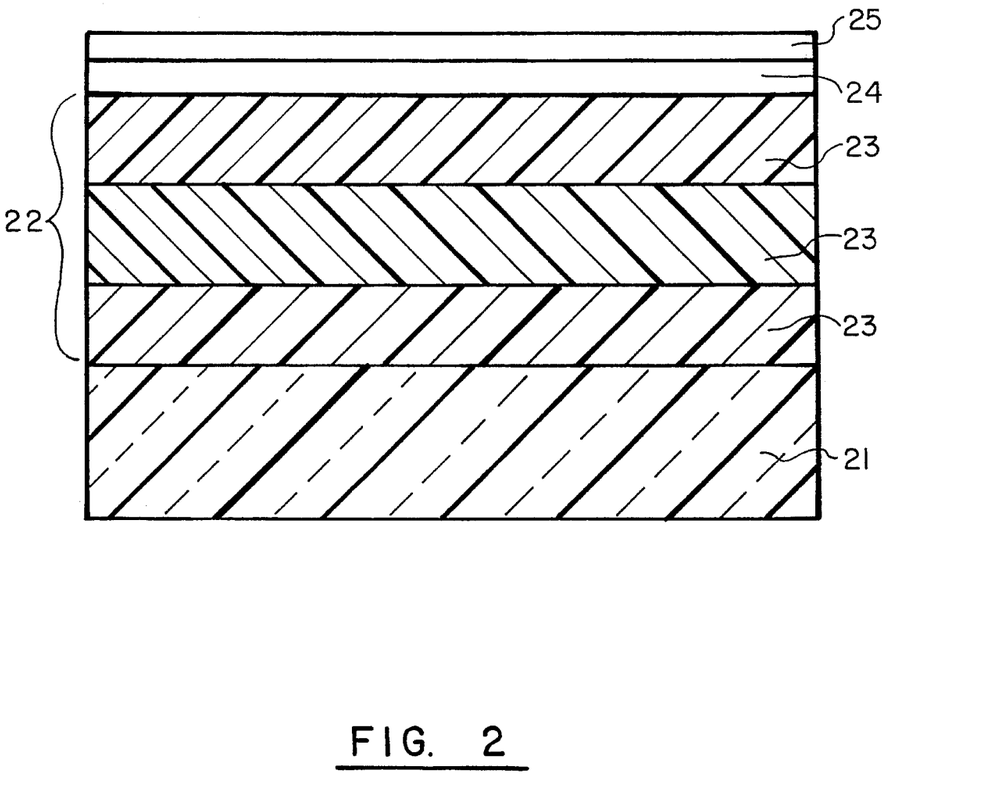
FIG. 2 shows a filter formed according to the present invention.

The filter formed by the method of the invention, as shown in FIG. 2 of the drawings, is schematically illustrated in FIGS. 3A–3G of the drawings.

The display element has a panel 21 with a filter stack 22 consisting of a plurality of pigmented layers 23 resting thereon. A planarizing layer 24 is located at the top of stack 22 and display electrodes 25 are located on the planarizing layer 24.

Figure 3A:
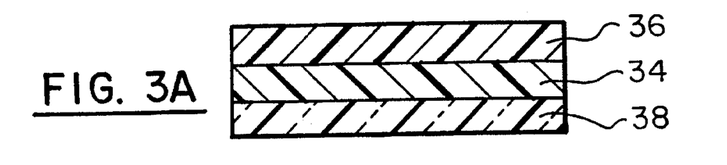
FIGS. 3A–3G illustrate the process for forming the color filters shown in FIG. 2.
Figure 3B:
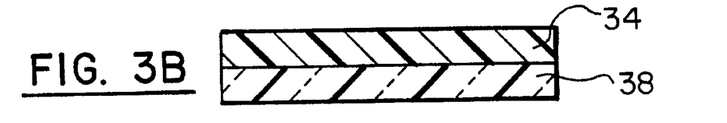

According to the method of the present invention, as shown in FIG. 3A of the drawings, an ultraviolet light-sensitive acrylic layer 34 having a pigment of a first of the chosen filter colors dispersed therein which is supported by a release layer 36 is laminated onto a carrier sheet 38 by the employment of heat and pressure. The carrier sheet 38 may be a plastic sheet. The release layer 36 is generally a plastic sheet with a suitable adhesive to releasably couple the release layer 36 to the acrylic layer 34. The acrylic layer 34 will form one of the pigmented layers 23 in the display element described above. Under the heat and pressure of the lamination process, adhesive between the acrylic layer 34 and the carrier sheet 38 bonds to become stronger than adhesive between the acrylic layer 34 and the release layer 36. The adhesive between the release layer 36 and the acrylic layer 34 may weaken during lamination. After lamination, release layer 36 is removed by peeling it off acrylic layer 34 with the adhesive remaining with the release layer 36, such as shown in FIG. 3B of the drawings. A typical pigmented acrylic layer and attached release layer may be one that is marketed by 3M Corporation under the trade name MATCHPRINT®, which is used in the printing industry for preparing color proofs. Pigmented layers and attached release layers manufactured by other companies may also be utilized.

Figure 3C:
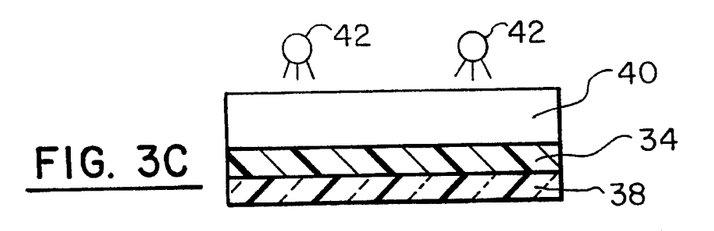

With reference to FIG. 3C of the drawings, a negative photomask 40, having the geometrical pattern desired for the specific color of first acrylic layer 34, is positioned next to and in intimate contact with acrylic layer 34 on carrier 38. Acrylic layer 34 and associated photomask 40 are exposed to a source 42 of ultraviolet light. The exposed acrylic layer 34 is then developed, using conventional film developing equipment, such as supplied to the printing industry by 3M Corporation or other companies for proofing, whereby the pigment is leached out of the unexposed portions of acrylic layer 34, leaving clear, transparent areas.

Figure 3D:
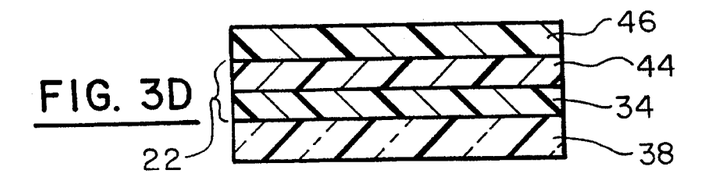
Figure 3E:
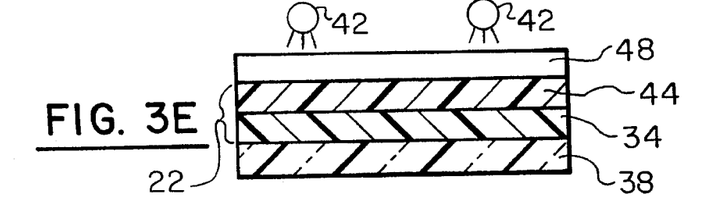

As shown in FIG. 3D of the drawings, an acrylic layer 44 containing pigmentation associated with the next color of the color filter is laminated by heat and pressure on top of the first acrylic layer 34. The acrylic layer 44 also forms a pigmented layer 23 in the display element shown in FIG. 2. The second acrylic layer 44 includes an associated release layer 46 which is subsequently removed after lamination. A negative photomask 48, having the appropriate geometrical pattern for the second acrylic layer 44, is placed next to and in intimate contact with the second acrylic layer 44. Photomask 48 is positioned in close registry with the first exposed pattern on the first acrylic layer 34. Pin registration may be used for proper alignment. The second acrylic layer 44 is exposed through photomask 48 and developed with a source 42 of ultraviolet light, as shown in FIG. 3E of the drawings, leaving a color replica of the second mask pattern. The drawings illustrate a filter stack 22 having only two pigmented layers 23 formed of acrylic layers 34 and 44 for clarity. Typically, additional pigmented layers are provided. The method is repeated to generate the desired filter structure which may consist of three primary colors, such as red, green and blue, together with a black pattern surrounding each colored element. Each color element may have a width of about 225 µ comprising about 150 µ for the color and about 75 µ for the black border. Additional layers may be added for color saturation up to a filter stack thickness of about 35 µ. With conventional filter patterns using these four colors, only two distinct photomasks need to be utilized. One photomask will correspond to the three primary colors which have identical pattern shapes requiring only that the photomask be appropriately offset for each color. A second photomask will correspond to the border or black pattern. The method of the present invention is not restricted to specific colors, and any combination and number of colors and layers can be utilized to generate color filters both of the additive color and subtractive color variety.

Figure 3F:
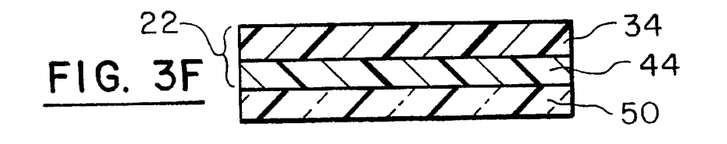

A large number of discrete filter patterns may be generated simultaneously utilizing this process, producing a plurality of filters on a single carrier sheet 38. This reduces the cost of fabrication of individual color filters and increases the efficiency of the entire method. At this stage of the process, the color filters can be inspected and those passing inspection can be trimmed to the appropriate size and laminated to a suitable transparent substrate 50 which has been coated with an adhesive. After lamination, carrier sheet 38 is peeled off, thereby leaving the filter stack 22 affixed to the transparent substrate 50, as shown in FIG. 3F of the drawings. The transparent substrate 50 will form the panel 21 of the display element shown in FIG. 2.

Figure 3G:
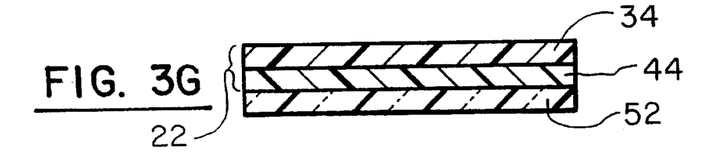

An alternative method of forming a plurality of color filters according to the present invention is shown in FIG. 3G of the drawings, wherein the active acrylic layers forming all of the color filters are laminated by heat and pressure to a large transparent substrate 52 to form a transparent substrate/filter assembly. The transparent substrate/filter assembly is then cut into separate color filters. The transparent substrate 52 will form the panel 21 of the display element shown in FIGS. 2 and 5 after the transparent substrate/filter assembly is cut into separate color filters.

Figure 4A:
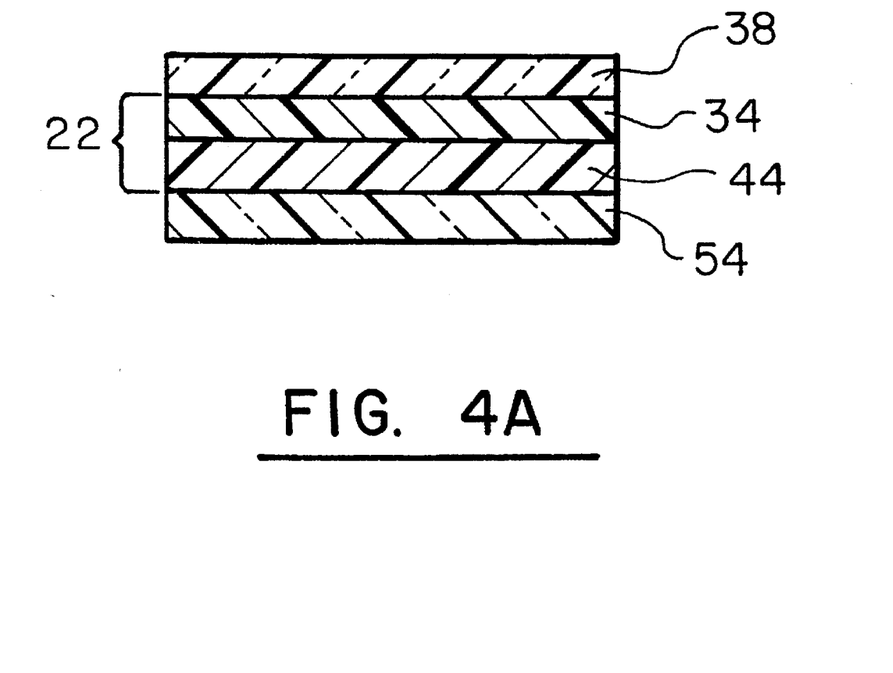
FIGS. 4A–4B show an alternative method for forming filters according to the invention.

Another method of forming a plurality of color filters according to the present invention is to transfer the completed filter stack by lamination by heat and pressure to another carrier sheet 54 which has a stronger bonding agent or adhesive than between the filter stack 22 and the original carrier sheet 38, as shown in FIG. 4A of the drawings, and peeling off the original carrier sheet 38 with the associated adhesive. The second carrier sheet 54 is also manufactured by 3M Corporation and others.

Figure 4B:
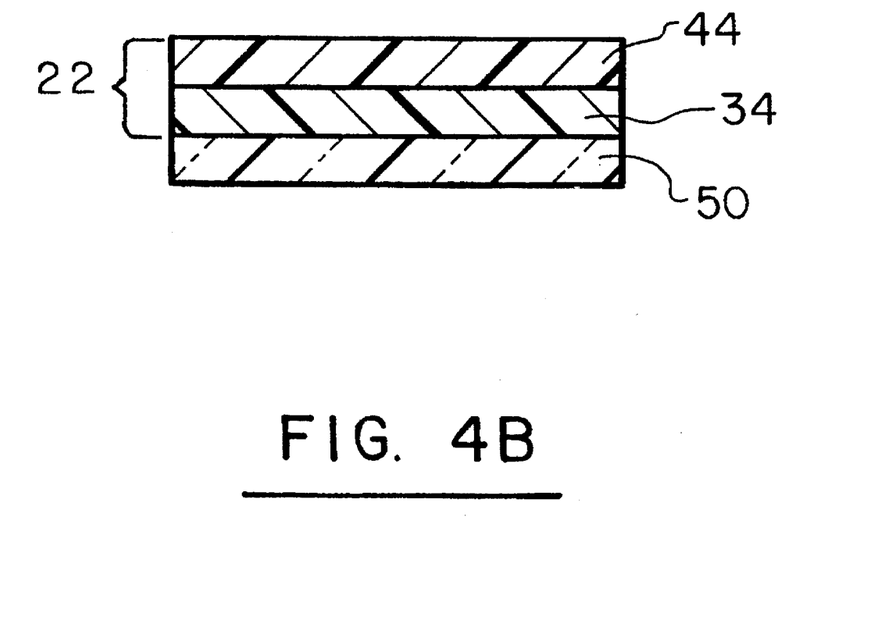

Subsequently, the filters are mounted on a transparent substrate 50 by the process previously described, i.e., laminating the filter stack to the transparent substrate 50 and peeling off the second carrier sheet 54 with the associated adhesive, as shown in FIG. 4B. It has been found that using a second carrier sheet 54 improves the color purity of the topmost layer by removing traces of adhesive that sometimes cling to the surface of the filter stack when using the single transfer process.

The transparent substrate/filter assembly normally provides one of the boundaries for the flat panel display, as shown in FIG. 2. In order to operate any flat panel display, whether of the liquid crystal type or another type, the face of the filter stack opposite to panel 21 must contain an electrically conductive pattern which also must be transparent. Transparent conductors, such as tin oxide and indium-tin oxide (ITO), are known in the art and can be sputtered or otherwise deposited on top of the filter stack. In order to provide a smooth, uniformly flat surface and to protect the filter stack from possible chemical attack during subsequent processing of the liquid crystal display in the active matrix, it is preferred to deposit a planarizing layer 24 on top of filter stack 22. Suitable planarizing media include benzocyclobutene (BCB) and perfluorocyclobutane (PFCB), such as sold by Dow Chemical Company. The planarizing layer 24 is then coated with an indium-tin oxide, and the indium-tin oxide is chemically etched into the pattern for the particular display.

Alternatively, a planarizing layer may be formed by laminating an indium-tin oxide coated microsheet glass onto the filter stack. The glass must be thin so that it does not generate a parallax problem when the display is viewed at an oblique angle. A parallax problem may occur if the lateral dimensions of the picture elements are of the same order of magnitude as the glass sheet thickness. Microsheet glass is available having a thickness of 35 microns, which is acceptable for present purposes.

Figure 5:
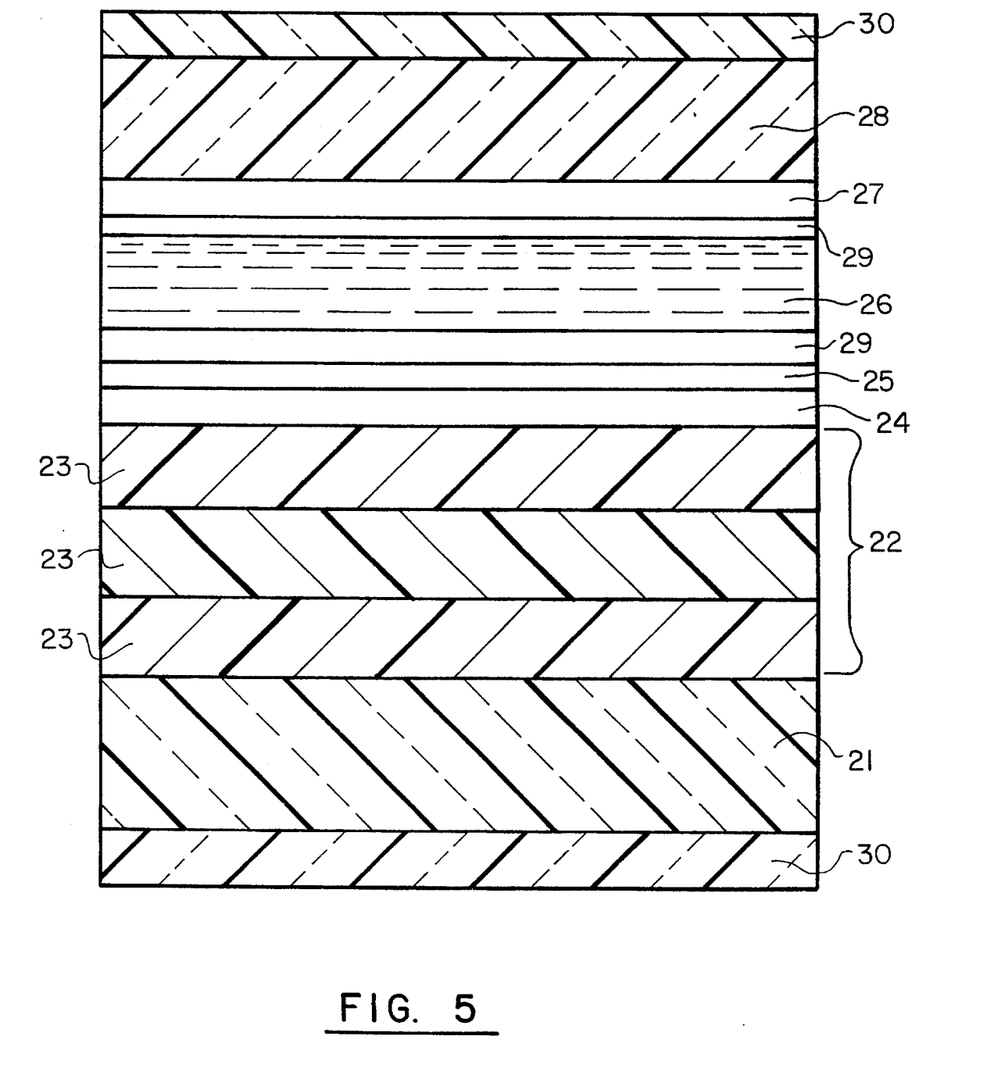
FIG. 5 shows the filter of FIG. 2 bonded to a display element.

FIG. 5 shows a complete display element with color filter. A liquid crystal layer 26 is located between alignment layers 29 which align the molecules within the liquid crystal layer 26 and adjacent to electrodes 25 and 27 which are positioned on opposed sides of the liquid crystal layer 26. A second panel 28 is located at the top of the display element with polarizing layers 30 adjacent the panel 21 and the second panel 28.

It will be apparent to those of ordinary skill in the art that various modifications may be made to the present invention without departing from the spirit and scope thereof. The scope of the present invention is only intended to be limited by the appended claims.

I claim:

1. A method of producing at least one color filter for an electronic display element comprising the steps of:
    a) laminating a pigmented layer structure onto a carrier sheet, wherein said pigmented layer structure includes an ultraviolet light-sensitive layer containing pigment of a first color of said at least one color filter and an attached release layer;
    b) removing said attached release layer;
    c) positioning a photomask adjacent said light-sensitive layer;
    d) exposing said light-sensitive layer to ultraviolet light;
    e) developing said exposed light-sensitive layer;
    f) laminating another pigmented layer structure onto said developed layer, wherein said another pigmented layer structure includes another ultraviolet light-sensitive layer containing pigment of another color of said at least one color filter and another attached release layer;
    g) removing said another attached release layer;
    h) positioning another photomask adjacent said another light-sensitive layer;
    i) exposing said another light-sensitive layer to ultraviolet light;
    j) developing said exposed another light-sensitive layer;
    k) repeating steps f) to j) for remaining colors of said color filter forming a stack of developed layers; and
    l) depositing transparent conductors onto said stack of developed layers.

2. The method of claim 1 further including:
    i) laminating said stack of developed layers and said carrier sheet to a backing layer; and
    ii) removing said carrier sheet from said stack of developed layers prior to depositing said transparent conductors onto said stack of developed layers.

3. The method of claim 2 wherein said backing layer is formed of glass.

4. The method of claim 3 further including cutting said stack into a plurality of color filters.

5. The method of claim 4 wherein said stack is cut into said plurality of color filters subsequent to laminating said stack of developed layers to said glass backing layer.

6. The method of claim 1 further including depositing a planarizing layer onto said stack of developed layers prior to depositing said transparent conductors onto said stack of developed layers.

7. The method of claim 6 wherein said planarizing layer is selected from the group consisting of benzocyclobutene and perfluorocyclobutane.

8. The method of claim 1 wherein depositing said transparent conductors onto said stack of developed layers includes laminating an indium-tin oxide coated glass sheet to said stack of developed layers.

9. The method of claim 8 wherein said coated glass sheet has a thickness no greater than about 35 microns.

10. The method of claim 1 further comprising cutting said stack of developed layers into a plurality of color filters.

11. The method of claim 1 wherein said display device is an active matrix.

12. The method of claim 1 wherein said stack of developed layers includes four layers including a red layer, green layer, blue layer and a black layer.

13. The method of claim 1 further including laminating the completed filter stack to a second carrier sheet and peeling off said original carrier sheet, whereby said second carrier sheet improves the color purity of the topmost layer by removing any traces of adhesive which cling to the surface of said filter stack.

* * * * *

UNITED STATES PATENT AND TRADEMARK OFFICE
CERTIFICATE OF CORRECTION

PATENT NO. : 5,463,484
DATED : October 31, 1995
INVENTOR(S) : Thomas P. Brody

It is certified that error appears in the above-indentified patent and that said Letters Patent is hereby corrected as shown below:

Title page, section [56] References Cited, OTHER PUBLICATIONS, in the *Product Information 3M* reference, "1II" should read --II--.

Column 1 Line 4 before the heading "BACKGROUND OF THE INVENTION", insert the following paragraph:
--This invention was made with government support under Grant No. MDA972-92-J-1010 awarded by the Advanced Research Projects Agency. The government has certain rights in this invention.--.

Signed and Sealed this

Second Day of April, 1996

Attest:

BRUCE LEHMAN

*Attesting Officer*  *Commissioner of Patents and Trademarks*

UNITED STATES PATENT AND TRADEMARK OFFICE
CERTIFICATE OF CORRECTION

PATENT NO.   :  5,463,484
DATED        :  October 31, 1995
INVENTOR(S)  :  Thomas P. Brody It is certified that error appears in the above-indentified patent and that said Letters Patent is hereby corrected as shown below:

Title page, section [54], "METHOD FOR MANUFACTURING LAMINATED U V-SENSITIVE COLOR FILTERS FOR LIQUID CRYSTAL DISPLAYS" should read --METHOD FOR MANUFACTURING COLOR FILTERS FOR LIQUID CRYSTAL DISPLAYS--.

Signed and Sealed this

Twenty-fourth Day of December, 1996

Attest:

BRUCE LEHMAN

*Attesting Officer*         *Commissioner of Patents and Trademarks*